United States Patent
Wilke

(10) Patent No.: US 9,810,431 B2
(45) Date of Patent: Nov. 7, 2017

(54) SILO COMBUSTION CHAMBER FOR A GAS TURBINE

(71) Applicant: Siemens Aktiengesellschaft, Munich (DE)

(72) Inventor: Martin Wilke, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/127,507

(22) PCT Filed: Mar. 19, 2015

(86) PCT No.: PCT/EP2015/055799
§ 371 (c)(1),
(2) Date: Sep. 20, 2016

(87) PCT Pub. No.: WO2015/150095
PCT Pub. Date: Oct. 8, 2015

(65) Prior Publication Data
US 2017/0130961 A1    May 11, 2017

(30) Foreign Application Priority Data
Mar. 31, 2014    (EP) .................................... 14162721

(51) Int. Cl.
*F23R 3/04*    (2006.01)
*F02C 7/10*    (2006.01)
(Continued)

(52) U.S. Cl.
CPC ................ *F23R 3/045* (2013.01); *F02C 7/10* (2013.01); *F23R 3/002* (2013.01); *F23R 3/42* (2013.01); *F23R 2900/03342* (2013.01)

(58) Field of Classification Search
CPC .. F23R 2900/03342; F23R 3/002; F23R 3/44; F23R 3/60; F23R 3/045; F02C 3/14;
(Continued)

(56) References Cited

U.S. PATENT DOCUMENTS

| 3,424,240 A |   | 1/1969 | Stein et al. |
|---|---|---|---|
| 4,339,925 A | * | 7/1982 | Eggmann ................ F01D 25/26 60/757 |

(Continued)

FOREIGN PATENT DOCUMENTS

| DE | 4006982 A1 | 9/1990 |
|---|---|---|
| EP | 0405730 A1 | 1/1991 |

(Continued)

OTHER PUBLICATIONS

EP Search Report dated Sep. 17, 2014, for EP application No. 14162721.6.

(Continued)

*Primary Examiner* — Andrew Nguyen
(74) *Attorney, Agent, or Firm* — Beusse Wolter Sanks & Maire

(57) ABSTRACT

A silo combustion chamber for a gas turbine having a flame tube having an inner wall and flame tube base delimiting a combustion chamber; an outer wall surrounding the inner wall, forming a cavity; an annular chamber at least partly surrounding the outer wall and a number of supply lines fluidically coupled to the hot side of a heat exchanger during operation of the turbine; a number of burners, each of which opens into the combustion chamber on the outlet side through an opening in the flame tube base. The oxygen supply is fluidically connected to the annular chamber. A collecting chamber is arranged over the flame tube base. The annular chamber is connected to the collecting chamber via each connecting piece, each burner is fluidically connected (Continued)

to the collecting chamber to supply oxygen. The cavity between the inner and outer wall is locally fluidically separated from the collecting chamber.

10 Claims, 4 Drawing Sheets

(51) Int. Cl.
*F23R 3/42* (2006.01)
*F23R 3/00* (2006.01)

(58) Field of Classification Search
CPC .... F02C 3/145; F02C 7/08; F02C 7/10; F01D 9/023
See application file for complete search history.

(56) References Cited

U.S. PATENT DOCUMENTS

| | | | |
|---|---|---|---|
| 4,356,698 A | | 11/1982 | Chamberlain |
| 4,458,481 A | * | 7/1984 | Ernst ................. F02C 3/14 60/39.511 |
| 5,079,911 A | | 1/1992 | Kumakura |
| 5,085,038 A | * | 2/1992 | Todman ............... F02C 3/14 60/39.37 |
| 5,819,540 A | | 10/1998 | Massarani |
| 6,094,916 A | * | 8/2000 | Puri ................... F23R 3/12 60/39.37 |
| 7,254,937 B2 | * | 8/2007 | Hull ................... F02C 7/08 60/266 |
| 2006/0130484 A1 | * | 6/2006 | Marcum ............. F01D 9/023 60/752 |

FOREIGN PATENT DOCUMENTS

| | | |
|---|---|---|
| EP | 1433924 A2 | 6/2004 |
| GB | 2044361 A | 10/1980 |
| JP | 2001107748 A | 4/2001 |
| JP | 2002317649 A | 10/2002 |
| JP | 2008115777 A | 5/2008 |

OTHER PUBLICATIONS

International Search Report dated Jun. 16, 2015, for PCT application No. PCT/EP2015/055799.
IPRP (PCT/ IPEA/416) dated Mar. 24, 2016, for PCT application No. PCT/EP2015/055799.
English Translation of IPRP (PCT/IPEA/409), dated Jun. 27, 2016, for PCT application No. PCT/EP2015/055799.
IPRP (PCT/ IPEA/416) dated Mar. 24, 2016, for PCT application No. PCT/EP2015/055199.

* cited by examiner

SILO COMBUSTION CHAMBER FOR A GAS TURBINE

CROSS REFERENCE TO RELATED APPLICATIONS

This application is the U.S. National Stage of International Application No. PCT/EP2015/055799 filed Mar. 19, 2015, and claims the benefit thereof. The International Application claims the benefit of European Application No. EP14162721 filed Mar. 31, 2014. All of the applications are incorporated by reference herein in their entirety.

FIELD OF INVENTION

The invention relates to a silo combustion chamber for a gas turbine, comprising a flame tube formed by an inner wall and a flame tube base and bounding a combustion space, an outer wall that surrounds the inner wall, forming a cavity, and a number of burners which each open, on the outlet side, into the combustion space via an opening in the flame tube base.

BACKGROUND OF INVENTION

In a gas turbine, the combustion heat of a fuel is converted into mechanical work. The thermodynamic cycle that describes this conversion corresponds approximately to the Joule cycle.

In that context, first an oxygen-containing working gas, in practice generally air, is compressed by a compressor chamber, in the course of which it heats up from a starting temperature $T_1$ to $T_2$, and the pressure increases. In the second step, heat is supplied to the working gas in a combustion chamber at constant pressure by burning the admixed fuel, as a result of which the temperature rises further to $T_3$. The compressed, heated working gas then performs mechanical work by expanding and in the process driving the turbine via blades. In so doing, the temperature drops to $T_4$. The pressure also drops. Some of the mechanical work obtained at the turbine can be used for compression in the first stage. In a last stage, waste heat is extracted from the working gas at constant pressure by cooling, whereby the temperature drops back to $T_1$. For the approximation of an ideal gas, the efficiency of the process is given by $$\eta = 1 - (T_4 - T_1)/(T_3 - T_2).$$

As a consequence of the widespread adoption of renewable energy generation in more and more industrialized countries, increased importance is placed on thermal power plants that use gas turbines. The lack of planning reliability that is naturally associated with energy generation using solar power or wind power must be equalized by sufficient reserve capacities in generation, which are also able to provide the required power as quickly as possible. In this case, power plants that are operated using gas turbines have a marked advantage, due to the volatility of the fuel used, over the thermodynamically more sluggish coal-fired power plants or even nuclear reactors.

The efficiency of a gas turbine as a quotient of the energy generated over the total energy content of the fuel used is well below 50%, even in a modern installation, since the heat supplied by combustion is discarded as waste heat, and thus the energy content of the waste heat after expansion of the working gas is no longer used.

However, the efficiency can be increased by using this waste heat, for example by using the waste heat in a second circuit to operate a steam turbine of a second thermal power plant (what is referred to as "combined cycle" technology). This allows the efficiency to be improved by the degree of waste heat that can be supplied to the steam turbine. However, this improvement in efficiency implies an increase in the system complexity, since it is now necessary to connect the entire steam circuit to the gas turbine and to coordinate it with the latter in terms of control, all of which increases the investment costs for a plant. In addition, many existing thermal power plants with gas turbines cannot readily be retrofitted with a steam circuit due to the dimensions of the components of the latter.

In this context, one possible further solution can be to use the waste heat of the exhaust gas of the gas turbine, by integration into a recuperator process, to further heat the working gas pre-compressed in the first step before the combustion heat of the fuel is supplied. Since in many gas turbines the temperature $T_2$ of the pre-compressed working gas is below the waste heat temperature $T_4$, in the ideal model the quantity of heat corresponding to this difference $T_4-T_2$ need not be supplied to the working gas by the energy content of the fuel but can be saved, which leads to a corresponding increase in efficiency.

In this context, one unsolved problem arises from the technical implementation of the integration in particular of an existing gas turbine system into a recuperator process, wherein the recirculation of the working gas from the heat exchanger is of particular significance here.

SUMMARY OF INVENTION

The invention has an object, in a gas turbine, of recirculating the working gas from a heat exchanger in the simplest possible manner.

The object is achieved, according to the invention, with a silo combustion chamber for a gas turbine that, in operation, can be coupled to a heat exchanger, comprising a flame tube formed by an inner wall and a flame tube base and bounding a combustion space, an outer wall that surrounds the inner wall, forming a cavity, an annular chamber surrounding the outer wall at least in sections and having a number of inflow lines, wherein the inflow lines can be fluidically coupled to the hot side of a heat exchanger during operation of the gas turbine, and a number of burners which each open, on the outlet side, into the combustion space via an opening in the flame tube base and whose oxygen supply is fluidically connected to the annular chamber.

In this context, the hot side of the heat exchanger is to be understood as all of the discharge lines from the region in which, in the heat exchanger, the transfer of heat between the working gas flowing through the latter and the heat supply takes place. In particular, it is possible in this context for the heat exchanger to be supplied with heat by the waste heat of the gas turbine, and in particular the gas turbine can have a compressor from which a portion of the working gas is supplied to the heat exchanger for heating.

In this context, the invention is based on the following considerations:

The design of a gas turbine requires complex modeling in terms of fluid dynamics, materials and thermodynamics and numerical calculations, which to a large degree have to be verified by practical testing on prototypes. Thus, any modification to an existing gas turbine system also requires that said models and calculations be adapted. It is thus of considerable advantage to configure a mechanism for recirculating the working gas from a heat exchanger to a combustion chamber a priori such that it can be integrated into an existing gas turbine design with minimal structural modifications. Moreover, this also opens up the possibility of retrofitting an already-commissioned gas turbine, in which no heat exchanger is provided, with relatively little expenditure.

Under the condition of minimal modifications, it is thus advantageous not to change the geometry of the flame tube which, in the design process, is a particularly complex component due to the high temperatures on combustion of the mixture of working gas and fuel and the desired forwarding of the exhaust gas thus formed to an expansion turbine. Thus, the inner wall and the flame tube base remain unchanged.

For minimum modifications to the outer wall, it is important to ensure that the cavity between the inner wall and the outer wall is advantageously charged with a proportion of the working gas pre-compressed by a compressor of the gas turbine, in order, in particular, to thus cool, from the outside, the inner wall which, during operation, is exposed to the high combustion temperatures in the combustion space. Advantageously, this is to be taken into account in the context of recirculation of the working gas from a heat exchanger. It is also to be taken into account that, in the event that the working gas from the heat exchanger is to be returned to a plurality of burners, for even combustion of the fuel mixed with the working gas, the working gas is to be supplied to the respective oxygen supply of the individual burners as a mass flow that is as even as possible, at a pressure that is as even as possible.

A realization which is essential to the invention is now to provide, outside the outer wall, an annular chamber surrounding the outer wall at least in sections and having a number of inflow lines, via which, during operation of the gas turbine, the working gas can be recirculated from the hot side of the heat exchanger toward the burners. The annular chamber makes it possible to supply the working gas to the respective oxygen supply of multiple burners at a pressure that is as homogeneous as possible. In that context, the fluidic connection from the annular chamber to a burner can be configured such that the outer wall requires only minor modification.

In this context, the annular chamber advantageously forms an open ring, i.e. the annular chamber does not entirely surround the outer wall. This can be fluidically advantageous depending on the number of inflow lines and the configuration of the connections with the or each burner. In particular in the case of one inflow line and a plurality of connections to burners, this suppresses undesired turbulence in the annular chamber.

In one advantageous configuration of the invention, the silo combustion chamber comprises a plenum chamber that is arranged above the flame tube base, and a number of connecting parts, wherein the annular chamber is connected to the plenum chamber via the or each connecting part, and the or each burner is fluidically connected to the plenum chamber for the purpose of oxygen supply, and wherein the cavity between the inner wall and the outer wall is locally fluidically separated from the plenum chamber.

Localized fluidic separation is to be understood as meaning that, in the silo combustion chamber itself or in its immediate vicinity, there is no direct fluidic connection between the plenum chamber and the cavity other than through a burner. In the following, and unless otherwise specified, a separation is always to be understood as a localized fluidic separation in a sense analogous to the above explanation.

By means of the plenum chamber that is arranged above the flame tube base and at least partially surrounds the or each burner, it is possible to achieve a particularly even pressure distribution in the region of the or each burner. This is advantageous in particular in the case of a plurality of burners, since in this case the oxygen supply of each burner from the working gas, which is recirculated heated by the heat exchanger, is charged essentially with the same pressure, which favors even combustion.

Since the cavity between the inner wall and the outer wall is advantageously charged with a proportion of the working gas pre-compressed by a compressor of the gas turbine, the separation between the plenum chamber and the cavity prevents this proportion of the working gas from being able to mix with the working gas in the plenum chamber, which has already been heated by the heat exchanger, which would otherwise lead to losses in efficiency. In this context, the flame tube base should advantageously be reinforced on one side or on both sides with a particularly heat-resistant material.

In an alternative embodiment of the invention, the silo combustion chamber comprises a number, corresponding to the number of burners, of connecting stubs which are each connected to the annular chamber, wherein the cavity extends above the flame tube base, and wherein the or each burner is enclosed by a connecting stub guided through the outer wall to the respective opening in the flame tube base, such that its oxygen supply is fluidically connected to the annular chamber and is locally fluidically separated from the cavity.

Direct connection of the oxygen supply of a burner to the annular chamber via a corresponding connecting stub allows for a particularly economical design for the recirculation of the working gas from the heat exchanger. This requires only relevant structural modifications to the outer wall through which the respective connecting stub is to be routed. By virtue of the fact that the cavity extends over the flame tube base, it can also be cooled by the working gas pre-compressed by a compressor of the gas turbine, as is the case for the inner wall. In contrast to existing designs, this results in no increased requirements in terms of the thermal loadability of the flame tube base.

In this context, the or each connecting stub advantageously has at least one expansion compensator. An expansion compensator makes it possible to equalize thermal stresses at a connecting stub, which can arise as a consequence of the different temperatures of the working gas inside the connecting stub and the working gas in the cavity flowing around the outside of the connecting stub. The pre-compressed working gas in the cavity can be at a temperature of 350° C.-400° C., while the heat exchanger heats the working gas to up to 550° C.

In this context, it is of additional advantage if the flame tube base has a multiplicity of bores. Bores of this type allow pre-compressed working gas to flow, as a consequence of the pressure difference and in small quantities, from the cavity into the combustion chamber, where it contributes to cooling the material of the flame tube base. This reduces the temperature for which materials used for the flame tube base need to be designed.

The inner wall advantageously has a multiplicity of bores. This reduces the temperature for which materials used for the inner wall need to be designed.

Expediently, the flame tube is essentially cylindrical. This is to be understood as a right cylinder whose base is axisymmetric or has high-order rotational symmetry. Such a shape permits particularly simple construction with a relatively advantageous pressure distribution both in the cavity and in the combustion space.

In this context, the arrangement of the or each burner in the flame tube base is in particular rotationally symmetric, which has a positive effect on the pressure distribution in the combustion space and promotes an even mass flow in each burner. This is advantageous for the expansion of the working gas which is mixed with fuel and burned, and thus contributes to an advantageous degree of efficiency.

In a further advantageous embodiment of the invention, the outer wall comprises a hood that is flanged onto the outer wall and extends over the region above the flame tube base. In particular, such a hood makes it possible to route a fuel line to a burner and connecting stubs from the annular chamber to a burner, or connecting parts from the annular chamber to the plenum chamber, and to provide other openings for the projecting portion of the or each burner. These measures simplify, in particular, the retrofitting of an existing gas turbine for use with a heat exchanger.

The invention also indicates a gas turbine and a thermal power plant having a corresponding gas turbine. In this context, the gas turbine comprises at least one silo combustion chamber of the above-described type, and a heat exchanger that is in particular designed as a recuperator, wherein the compressor of the gas turbine is fluidically connected to the cold side of the recuperator, and wherein the hot side of the recuperator is fluidically connected to the annular chamber via the or each inflow line.

In that context, the stated advantages of the silo combustion chamber and its refinements can, as appropriate, be transferred to the gas turbine and to the thermal power plant comprising the gas turbine.

BRIEF DESCRIPTION OF THE DRAWINGS

Exemplary embodiments of the invention will be explained in greater detail below with reference to drawings in which, schematically.

Mutually corresponding parts and variables are in each case provided with identical reference signs in all figures.

DETAILED DESCRIPTION OF INVENTION

Figure 1:
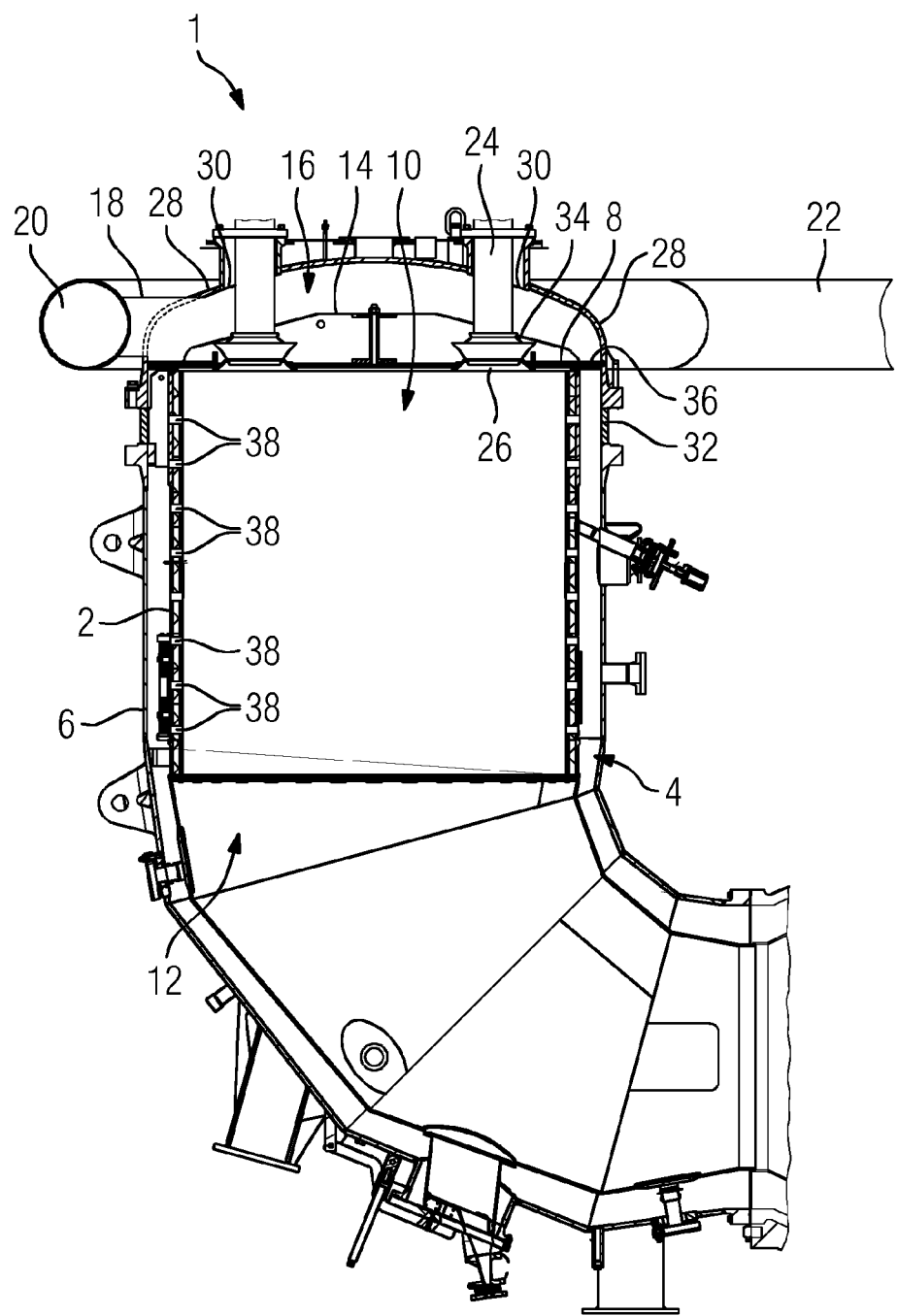
FIG. 1 shows, in a cross-sectional representation, a silo combustion chamber having an annular chamber and a plenum chamber connected thereto.

FIG. 1 shows, in a cross-sectional representation, a silo combustion chamber 1 for a gas turbine which is not shown in greater detail. The silo combustion chamber 1 comprises an inner wall 2 which is surrounded by an outer wall 6, forming a cavity 4. The inner wall 2, with the adjoining flame tube base 8, bounds the essentially cylindrical combustion space 10 of the flame tube 12. On that side of the flame tube base 8 which is oriented away from the combustion space 10 and is reinforced there by a supporting structure 14, there is arranged a plenum chamber 16 that is connected, via connecting parts 18, to an annular chamber 20 that surrounds the silo combustion chamber 1 outside the outer wall 6. An inflow line 22 leads from a recuperator (not shown in the drawing) to the annular chamber 20. The burners 24 open, from the plenum chamber 16, via openings 26 into the combustion chamber 10.

The plenum chamber 16 is bounded, above the burner 24, by a flanged-on hood 28 in which there are provided cutouts 30 for the burners 24, and from which the connecting parts 18 lead to the annular chamber 20. In this configuration, the hood 28 is flanged onto a circumferential ring 32, wherein the hood 28 and the ring 32 are respectively to be construed as part of the outer wall 6. The plenum chamber 16 and the connecting parts 18 increase the required installation space above the flame tube base 8, in comparison to a configuration without a recuperator. Here, the required height is obtained by virtue of the ring 32.

From a compressor (not shown in greater detail) of the gas turbine, part of the pre-compressed working gas is supplied to a recuperator and is heated thereby. The working gas heated by the recuperator is conveyed via the inflow line 22 into the annular chamber 20, whence it passes via the connecting part 18 into the plenum chamber 16, where it can flow into the respective oxygen supply 34 for the burners 24. In the burners 24, the compressed working gas, heated by the recuperator, is mixed with a fuel and is burnt in the combustion space 10 of the flame tube 12, the exhaust gases and waste heat being removed via the flame tube 12 to the recuperator, where the waste heat is used to heat the pre-compressed working gas.

Another part of the pre-compressed working gas is conveyed, in a manner not shown in greater detail, into the cavity 4. The cavity 4 is separated from the plenum chamber 16 by partition plates 36 extending the flame tube base 8. In this context, small bores 38 in the inner wall 2 up to the height of the partition plates 36 can help to cool the inner wall 2. The pre-compressed working gas, which flows through the cavity 4, can be at a temperature of 300° C.-400° C. The temperature in the region of the burners 24 can be greater than 1400° C. The material of the flame tube base 8 and of the inner wall 2 must be designed for the resulting combustion temperatures, which leads to costs, e.g. for ceramic plates.

The pre-compressed working gas flowing into the combustion space 10 via the bores 38 in the inner wall 2 cools the inner wall 2 in this region, as a consequence of the temperature drop, such that the materials there can be designed for a lower temperature range. The bores 38 are in this context to be made so small that the quantity of the working gas flowing through the bores 38 for cooling the inner wall 2 is as small as possible (with the boundary condition of a desired minimum cooling power), and such that in particular there is no significant loss of pressure in the cavity 4. Since the working gas heated by the recuperator can be at a temperature of up to 600° C. the cooling effect through corresponding bores in the flame tube base 8 would be less, for which reason it is advantageous here to design the material of the flame tube base 8 in a different manner for the high combustion temperatures.

Figure 2:
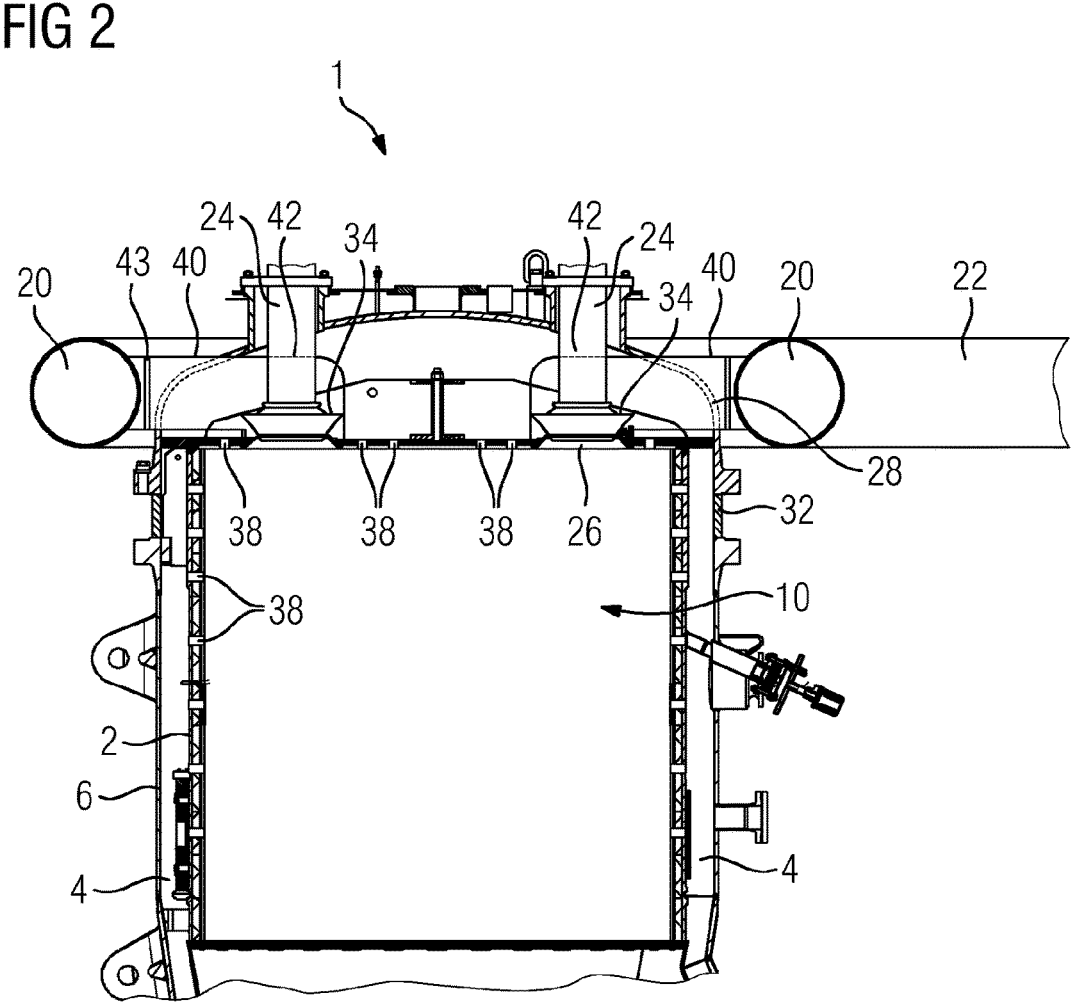
FIG. 2 shows, in a cross-sectional representation, a silo combustion chamber having an annular chamber from which connecting stubs lead to the individual burners.

FIG. 2 shows, in a cross-sectional representation, another possible configuration of a silo combustion chamber 1 for a gas turbine which is not shown in greater detail. In this case, the cavity 4 that is formed between the inner wall 2 and the outer wall 6 extends over the flame tube base 8. Connecting stubs 40, which are routed through the hood 28 flanged onto the ring 32, each lead from the annular chamber 20 to a burner 24. The connecting stub 40 then encloses the oxygen supply 34 for the respective burner 24 up to its opening 26 into the combustion space 10, such that the oxygen supply 34 is locally fluidically separated from the cavity 4. The pre-compressed working gas heated by the recuperator is thus supplied, via the inflow line 22, the annular chamber 20 and the corresponding connecting stub 40, directly to the oxygen supply 34 of the respective burner 24. The respective burner 24 can be connected to a fuel supply via a cutout 42 in the connecting stub 40. In order to better accommodate the thermal stresses arising due to the different temperatures inside and outside the connecting stub 40, an expansion compensator 43 is integrated into each connecting stub.

In this configuration, the flame tube base 8 can also have small bores 38 for cooling the material.

Figure 3:
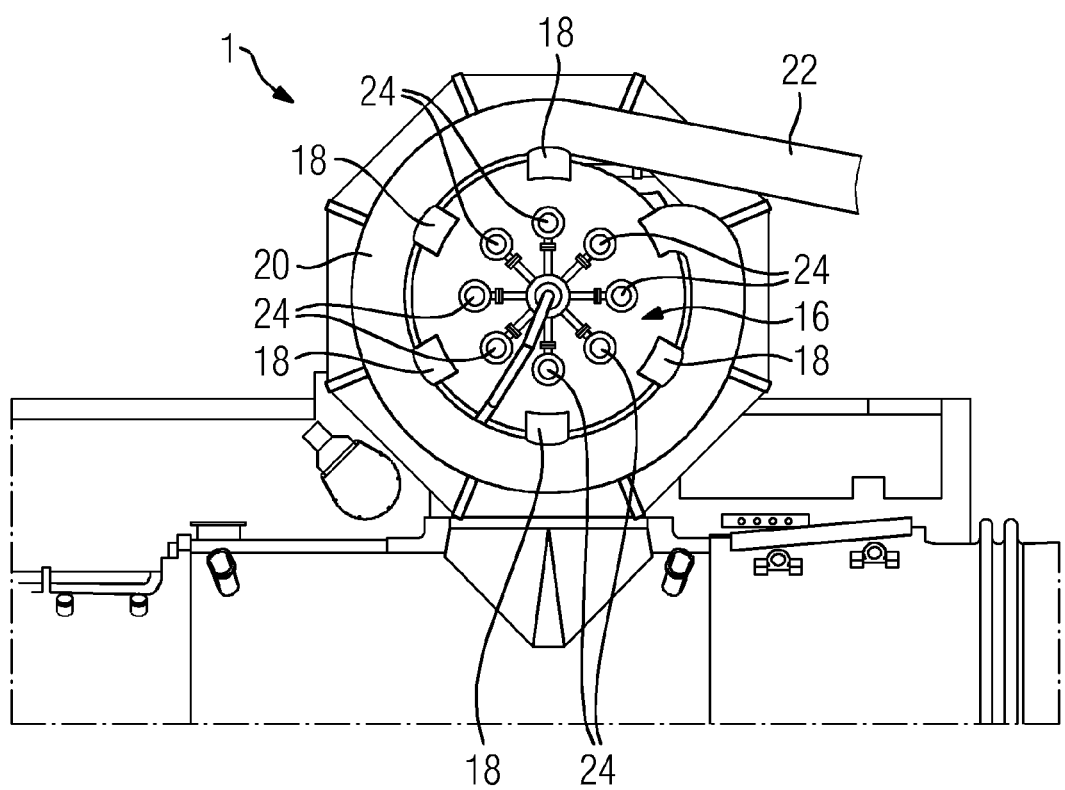
FIG. 3 shows, in a plan view, a silo combustion chamber having an annular chamber designed as an open ring.

FIG. 3 shows, in a plan view, a silo combustion chamber 1 having an annular chamber 20 designed as an open ring. From the annular chamber 20 connected to the inflow line 22, six connecting parts 18, arranged circumferentially, lead to the plenum chamber 16 in which there are arranged eight burners 24.

Figure 4:
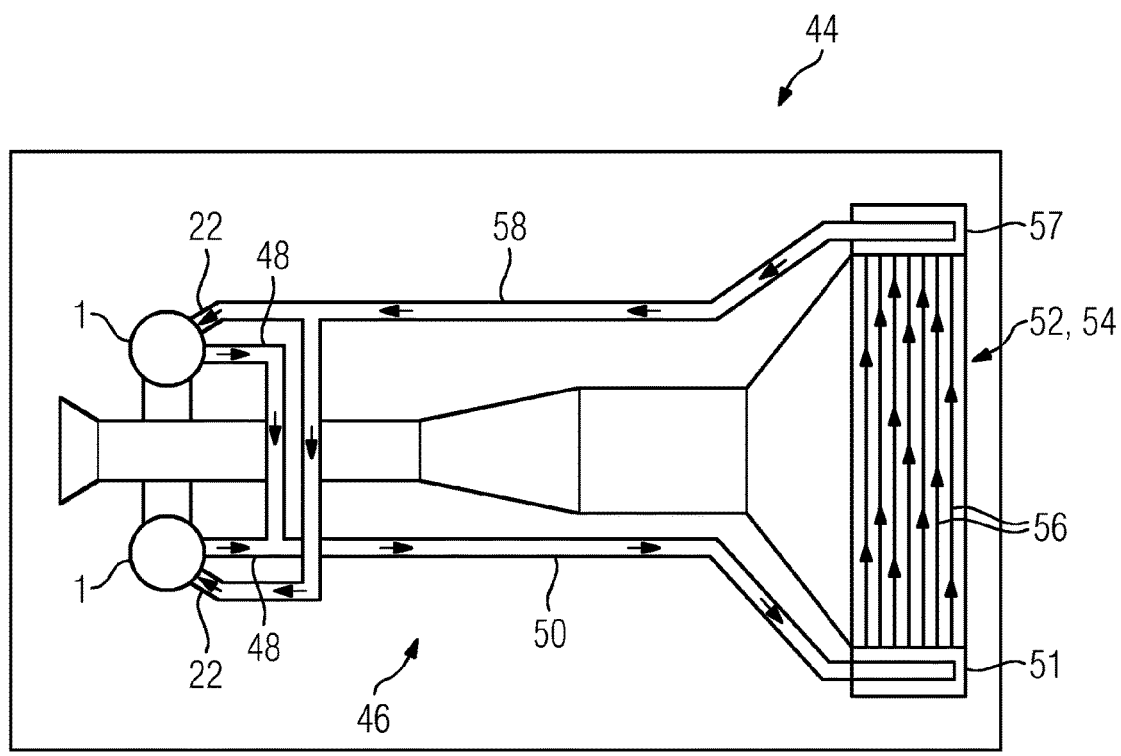
FIG. 4 shows, in a plan view, a thermal power plant having a gas turbine.

FIG. 4 shows, in a schematic plan view, a thermal power plant 44 with a gas turbine 46 having two silo combustion chambers 1. From the cavities (in each case not shown in greater detail), a line system 50 leads via discharge lines 48 to a cold side 51 of the heat exchanger 54 that is designed as a recuperator 52. In this heat exchanger, the pre-compressed working gas, which is supplied to the recuperator 52 via the line system 50, is heated in fine pipes 56 by the waste heat of the combustion process of the gas turbine 46. The heated working gas is supplied from the hot side 57 of the recuperator 52, via a line system 58, to the respective inflow lines 22 of the silo combustion chambers 1, where it enters the respective plenum chamber and there flows into the oxygen supply of the burner, where it is mixed with the fuel and is burnt in the combustion space. This produces the waste heat which, in the recuperator 52, heats the pre-compressed working gas. The first plenum chamber, the burners, their oxygen supply and the combustion spaces are not shown in greater detail in the drawing.

Although the invention has been described and illustrated in greater detail by means of the preferred exemplary embodiment, the invention is not limited by this exemplary embodiment. Other variants can be derived herefrom by a person skilled in the art without departing from the protective scope of the invention.

The invention can further encompass the following subject matter:

A silo combustion chamber (1) for a gas turbine (46) that, in operation, can be coupled to a heat exchanger (54), comprising a flame tube (12) formed by an inner wall (2) and a flame tube base (8) and bounding a combustion space (10), an outer wall (6) that surrounds the inner wall (2), forming a cavity (4), an annular chamber (20) surrounding the outer wall (6) at least in sections and having a number of inflow lines (22), wherein the inflow lines (22) can be fluidically coupled to the hot side (57) of a heat exchanger (54) during operation of the gas turbine (46), and a number of burners (24) which each open, on the outlet side, into the combustion space (10) via an opening (26) in the flame tube base (8) and whose oxygen supply (34) is fluidically connected to the annular chamber (20).

A silo combustion chamber (1) as described above, wherein the annular chamber (20) forms an open ring.

A silo combustion chamber (1) as described above, comprising a plenum chamber (16) that is arranged above the flame tube base (8), and a number of connecting parts (18), wherein the annular chamber (20) is connected to the plenum chamber (16) via the or each connecting part (18), and the or each burner (24) is fluidically connected to the plenum chamber (16) for the purpose of oxygen supply, and wherein the cavity (4) between the inner wall (2) and the outer wall (6) is locally fluidically separated from the plenum chamber (16).

Alternatively, a silo combustion chamber (1) as described above, comprising a number, corresponding to the number of burners (24), of connecting stubs (40) which are each connected to the annular chamber (20), wherein the cavity extends above the flame tube base (8), and wherein the or each burner (24) is enclosed by a connecting stub (40) guided through the outer wall (6) to the respective opening (26) in the flame tube base (8), such that its oxygen supply (34) is fluidically connected to the annular chamber (20) and is locally fluidically separated from the cavity (4). In a further embodiment, the or each connecting stub can have at least one expansion compensator (43). Alternatively or in addition, the flame tube base (8) can have a multiplicity of bores (38).

A silo combustion chamber (1) as described above, wherein the inner wall (2) has a multiplicity of bores (38).

A silo combustion chamber (1) as described above, wherein the flame tube (8) is essentially cylindrical.

A silo combustion chamber (1) as described above, wherein the arrangement of the or each burner (24) in the flame tube base (8) is rotationally symmetric.

A silo combustion chamber (1) as described above, wherein the outer wall comprises a flanged-on hood (28) that extends over the region above the flame tube base (8).

A gas turbine (46), comprising at least one silo combustion chamber (1) as described above, and a heat exchanger (54) that is in particular designed as a recuperator (52), wherein the compressor of the gas turbine (46) is fluidically connected to the cold side (51) of the recuperator (52), and wherein the hot side (57) of the recuperator (52) is fluidically connected to the annular chamber (20) via the or each inflow line (22).

A thermal power plant (44) having a gas turbine (46) as described above.

The invention claimed is:

1. A silo combustor arrangement for a gas turbine, comprising
    a flame tube formed by an inner wall and a flame tube base and bounding a combustion space,
    an outer wall that surrounds the inner wall,
    a cavity defined in part by the inner wall and by the outer wall,
    a conduit that is disposed outside of an external casing of a silo combustor of the silo combustor arrangement and curved to form an annular chamber in fluid communication with at least one inflow line, wherein the at least one inflow line is configured to be fluidically coupled to a hot side of a heat exchanger during operation of the gas turbine,
    at least one burner which opens, on an outlet side, into the combustion space via an opening in the flame tube base and whose oxygen supply is fluidically connected to the annular chamber,
    a plenum chamber that is arranged above the flame tube base, and at least one connecting part that connects the conduit to the outer wall and provides fluid communication therethrough from the annular chamber, through a side wall of the conduit, and to the plenum chamber, and
    partition plates that partly define the cavity and the plenum chamber and which fluidically separate the cavity from the plenum chamber
    wherein the at least one burner is fluidically connected to the plenum chamber for the purpose of oxygen supply.

2. The silo combustor arrangement as claimed in claim 1, wherein the annular chamber forms an arc comprising an arc-length of less than 360 degrees.

3. The silo combustor arrangement as claimed in claim 1, wherein the inner wall has a multiplicity of bores.

4. The silo combustor arrangement as claimed in claim 1, wherein the flame tube is essentially cylindrical.

5. The silo combustor arrangement as claimed in claim 4, wherein an arrangement of the at least one burner in the flame tube base is rotationally symmetric.

6. The silo combustor arrangement as claimed in claim 1, wherein the outer wall comprises a flanged-on hood that extends over a region above the flame tube base.

7. A gas turbine, comprising
the silo combustor arrangement as claimed in claim 1, and
the heat exchanger that is designed as a recuperator, and
wherein a compressor of the gas turbine is fluidically connected to a cold side of the recuperator.

8. A thermal power plant comprising:
a gas turbine as claimed in claim 7.

9. A gas turbine engine silo combustor arrangement, comprising:
a flame tube formed by an inner wall and a flame tube base and bounding a combustion space,
an outer wall that surrounds the inner wall,
a cavity defined in part by the inner wall and by the outer wall,
a conduit that is disposed outside of an external casing of a silo combustor of the silo combustor arrangement and curved to form an annular chamber,
a plenum chamber that is arranged above the flame tube base,
at least one burner fluidically connected to the plenum chamber and comprising an opening which opens into the combustion space via an opening in the flame tube base and whose oxygen supply is fluidically connected to the annular chamber,
at least one connecting part that connects the conduit to the outer wall and provides fluid communication therethrough from the annular chamber, through a side wall of the conduit, and to the plenum chamber, and
partition plates that partly define the cavity and the plenum chamber and which fluidically separate the cavity from the plenum chamber.

10. A gas turbine engine comprising: a heat exchanger and a silo combustor arrangement, the silo combustor arrangement comprising:
a flame tube formed by an inner wall and a flame tube base and bounding a combustion space,
an outer wall that surrounds the inner wall,
a cavity defined in part by the inner wall and by the outer wall and in fluid communication with the combustion space via bores in the inner wall,
a conduit that is disposed outside of an external casing of a silo combustor of the silo combustor arrangement and curved to form an annular chamber,
an inflow line providing fluid communication between a hot side of the heat exchanger and the annular chamber,
a plenum chamber that is arranged above the flame tube base,
at least one burner fluidically connected to the plenum chamber and comprising an opening which opens into the combustion space via an opening in the flame tube base and whose oxygen supply is fluidically connected to the annular chamber, and
at least one connecting part that is connected to the conduit, passes through the outer wall, passes through the plenum chamber, and ends at the opening into the combustion space, such that the at least one connecting part provides direct fluid communication between the annular chamber and a burner disposed at the opening.

* * * * *